(12) United States Patent
Jaye et al.

(10) Patent No.: US 9,037,637 B2
(45) Date of Patent: May 19, 2015

(54) DUAL BLIND METHOD AND SYSTEM FOR ATTRIBUTING ACTIVITY TO A USER

(75) Inventors: Daniel Jaye, Celebration, FL (US); James Q. Secretan, Orlando, FL (US)

(73) Assignee: J.D. Power and Associates, Westlake Village, CA (US)

( * ) Notice: Subject to any disclaimer, the term of this patent is extended or adjusted under 35 U.S.C. 154(b) by 0 days.

(21) Appl. No.: 13/366,489

(22) Filed: Feb. 6, 2012

(65) Prior Publication Data

US 2013/0036159 A1    Feb. 7, 2013

Related U.S. Application Data

(60) Provisional application No. 61/443,122, filed on Feb. 15, 2011.

(51) Int. Cl.
  *G06F 15/16* (2006.01)
  *G06F 21/62* (2013.01)

(52) U.S. Cl.
  CPC .................................. *G06F 21/6254* (2013.01)

(58) Field of Classification Search
  CPC ..... G06F 21/6254; G06F 15/16; H04L 67/42; H04L 67/10
  USPC .......... 709/203, 224, 225, 226, 227, 206, 204
  See application file for complete search history.

(56) References Cited

U.S. PATENT DOCUMENTS

| | | | |
|---|---|---|---|
| 5,754,938 A | 5/1998 | Herz et al. | |
| 5,754,939 A | 5/1998 | Herz et al. | |
| 5,835,087 A | 11/1998 | Herz et al. | |
| 5,862,325 A | 1/1999 | Reed et al. | |
| 5,892,909 A | 4/1999 | Grasso et al. | |
| 6,018,724 A | 1/2000 | Arent | |
| 6,029,195 A | 2/2000 | Herz | |
| 6,088,717 A | 7/2000 | Reed et al. | |
| 6,317,727 B1 | 11/2001 | May | |
| 6,345,288 B1 | 2/2002 | Reed et al. | |
| 6,418,470 B2 | 7/2002 | Blumenau | |
| 6,421,653 B1 | 7/2002 | May | |
| 6,460,036 B1 | 10/2002 | Herz | |
| 6,466,975 B1 | 10/2002 | Sterling | |
| 6,574,617 B1 | 6/2003 | Immerman et al. | |
| 6,663,105 B1 | 12/2003 | Sullivan et al. | |
| 6,742,026 B1 | 5/2004 | Kraenzel et al. | |
| 6,757,710 B2 | 6/2004 | Reed | |
| 6,766,328 B2 | 7/2004 | Stefanchik et al. | |
| 6,785,721 B1 | 8/2004 | Immerman et al. | |
| 6,845,383 B1 | 1/2005 | Kraenzel et al. | |
| 6,845,448 B1 | 1/2005 | Chaganti et al. | |
| 6,853,988 B1 | 2/2005 | Dickinson et al. | |
| 6,854,016 B1 | 2/2005 | Kraenzel et al. | |
| 6,882,985 B1 | 4/2005 | Kay et al. | |
| 6,941,285 B2 | 9/2005 | Sarcanin | |
| 6,957,199 B1 | 10/2005 | Fisher | |
| 6,996,540 B1 | 2/2006 | May | |
| 6,996,780 B2 | 2/2006 | Estrada | |

(Continued)

*Primary Examiner* — Vivek Srivastava
*Assistant Examiner* — Normin Abedin
(74) *Attorney, Agent, or Firm* — Rothwell, Figg, Ernst & Manbeck PC

(57) ABSTRACT

A method and system for attributing activity to a user includes sharing information with an analytics server while attributes and a user profile cannot be tracked back to the original user from the analytics server. A temporary ID included in the shared information is destroyed, thus eliminating any trace back.

16 Claims, 6 Drawing Sheets

(56) References Cited

U.S. PATENT DOCUMENTS

| | | |
|---|---|---|
| 7,013,290 B2 | 3/2006 | Ananian |
| 7,020,686 B2 | 3/2006 | Banatwala |
| 7,028,262 B2 | 4/2006 | Estrada et al. |
| 7,069,427 B2 | 6/2006 | Adler et al. |
| 7,076,736 B2 | 7/2006 | Hugh |
| 7,099,934 B1 | 8/2006 | Ewing et al. |
| 7,107,285 B2 | 9/2006 | von Kaenel et al. |
| 7,127,676 B2 | 10/2006 | Linsey et al. |
| 7,140,044 B2 | 11/2006 | Redlich et al. |
| 7,146,644 B2 | 12/2006 | Redlich et al. |
| 7,159,116 B2 | 1/2007 | Moskowitz |
| 7,187,771 B1 | 3/2007 | Dickinson et al. |
| 7,188,110 B1 | 3/2007 | Ludtke et al. |
| 7,191,252 B2 | 3/2007 | Redlich et al. |
| 7,213,032 B2 | 5/2007 | Mascarenhas |
| 7,213,047 B2 | 5/2007 | Yeager et al. |
| 7,219,304 B1 | 5/2007 | Kraenzel et al. |
| 7,251,609 B1 | 7/2007 | McAlindon et al. |
| 7,254,608 B2 | 8/2007 | Yeager et al. |
| 7,260,724 B1 | 8/2007 | Dickinson et al. |
| 7,290,035 B2 | 10/2007 | Mattathil |
| 7,295,995 B1 | 11/2007 | York et al. |
| 7,313,825 B2 | 12/2007 | Redlich et al. |
| 7,318,049 B2 | 1/2008 | Iannacci |
| 7,322,047 B2 | 1/2008 | Redlich et al. |
| 7,325,252 B2 | 1/2008 | Bunker et al. |
| 7,328,243 B2 | 2/2008 | Yeager et al. |
| 7,340,438 B2 | 3/2008 | Nordman et al. |
| 7,349,987 B2 | 3/2008 | Redlich et al. |
| 7,353,396 B2 | 4/2008 | Micali et al. |
| 7,360,082 B1 | 4/2008 | Berthold et al. |
| 7,391,865 B2 | 6/2008 | Orsini et al. |
| 7,424,543 B2 | 9/2008 | Rice, III |
| 7,472,192 B2 | 12/2008 | DeFerranti et al. |
| 7,483,871 B2 | 1/2009 | Herz |
| 7,509,274 B2 | 3/2009 | Kam et al. |
| 7,533,113 B1 | 5/2009 | Haddad |
| 7,546,334 B2 | 6/2009 | Redlich et al. |
| 7,562,304 B2 | 7/2009 | Dixon et al. |
| 7,571,136 B2 | 8/2009 | May |
| 7,577,621 B2 | 8/2009 | Dickinson et al. |
| 7,587,368 B2 | 9/2009 | Felsher |
| 7,590,589 B2 | 9/2009 | Hoffberg |
| 7,603,317 B2 | 10/2009 | Adler |
| 7,610,390 B2 | 10/2009 | Yared et al. |
| 7,630,903 B1 | 12/2009 | Vaidyanathan et al. |
| 7,630,904 B2 | 12/2009 | Vaidyanathan et al. |
| 7,630,986 B1 | 12/2009 | Herz et al. |
| 7,640,341 B2 | 12/2009 | Regan |
| 7,647,259 B2 | 1/2010 | de Fabrega |
| 7,660,413 B2 | 2/2010 | Partovi et al. |
| 7,660,815 B1 | 2/2010 | Scofield et al. |
| 7,668,885 B2 | 2/2010 | Wittke et al. |
| 7,669,051 B2 | 2/2010 | Redlich et al. |
| 7,685,192 B1 | 3/2010 | Scofield et al. |
| 7,685,224 B2 | 3/2010 | Nye |
| 7,689,497 B2 | 3/2010 | May |
| 7,729,925 B2 | 6/2010 | Maritzen et al. |
| 7,730,030 B1 | 6/2010 | Xu |
| 7,734,518 B2 | 6/2010 | Toffey |
| 7,738,900 B1 | 6/2010 | Manroa et al. |
| 7,765,481 B2 | 7/2010 | Dixon et al. |
| 7,779,014 B2 | 8/2010 | York et al. |
| 7,783,698 B2 * | 8/2010 | Jain ............................... 709/203 |
| 7,788,188 B2 | 8/2010 | Kramer |
| 7,788,238 B2 | 8/2010 | Gabriel et al. |
| 7,797,371 B2 | 9/2010 | Singh et al. |
| 7,802,104 B2 | 9/2010 | Dickinson et al. |
| 7,805,377 B2 | 9/2010 | Felsher |
| 7,814,139 B2 | 10/2010 | Singh et al. |
| 7,822,620 B2 | 10/2010 | Dixon et al. |
| 7,849,204 B2 | 12/2010 | Yared et al. |
| 7,856,360 B2 | 12/2010 | Kramer et al. |
| 7,861,260 B2 | 12/2010 | Shkedi |
| 7,864,716 B1 | 1/2011 | Manroa et al. |
| 7,865,393 B2 | 1/2011 | Leason et al. |
| 7,885,844 B1 | 2/2011 | Cohen et al. |
| 7,890,609 B2 | 2/2011 | Shkedi |
| 7,890,612 B2 | 2/2011 | Todd et al. |
| 7,895,258 B2 | 2/2011 | Singh et al. |
| 7,899,702 B2 | 3/2011 | Melamed et al. |
| 7,930,252 B2 | 4/2011 | Bender et al. |
| 7,953,739 B2 | 5/2011 | York et al. |
| 7,958,268 B2 | 6/2011 | Redlich et al. |
| 7,962,363 B2 | 6/2011 | Patel et al. |
| 7,962,761 B1 | 6/2011 | Spalka et al. |
| 7,962,962 B2 | 6/2011 | Adler et al. |
| 7,980,378 B2 | 7/2011 | Jones et al. |
| 7,984,514 B1 | 7/2011 | Meketa |
| 7,992,198 B2 | 8/2011 | Guarraci et al. |
| 7,996,888 B2 | 8/2011 | Asunmaa et al. |
| 8,005,720 B2 | 8/2011 | King et al. |
| 8,009,830 B2 | 8/2011 | Orsini et al. |
| 8,024,581 B2 | 9/2011 | Spalka et al. |
| 8,028,896 B2 | 10/2011 | Carter et al. |
| 8,037,194 B2 | 10/2011 | Yared et al. |
| 8,037,202 B2 | 10/2011 | Yeager et al. |
| 8,055,709 B2 | 11/2011 | Singh et al. |
| 8,069,169 B2 | 11/2011 | Fitzpatrick et al. |
| 8,082,225 B2 | 12/2011 | Jung et al. |
| 8,095,621 B2 | 1/2012 | Singh et al. |
| 8,099,496 B2 | 1/2012 | Singh et al. |
| 8,108,455 B2 | 1/2012 | Yeager et al. |
| 8,117,281 B2 | 2/2012 | Robinson et al. |
| 8,117,644 B2 | 2/2012 | Chaganti et al. |
| 8,135,134 B2 | 3/2012 | Orsini et al. |
| 8,140,385 B2 | 3/2012 | Leason et al. |
| 8,145,523 B2 | 3/2012 | Leason et al. |
| 8,156,326 B2 | 4/2012 | Di Giusto et al. |
| 8,166,104 B2 | 4/2012 | Shein et al. |
| 8,171,032 B2 | 5/2012 | Herz |
| 8,171,524 B2 | 5/2012 | Micali et al. |
| 8,176,563 B2 | 5/2012 | Redlich et al. |
| 8,181,858 B2 | 5/2012 | Carter et al. |
| 8,194,642 B2 | 6/2012 | Rosenberg et al. |
| 8,200,527 B1 | 6/2012 | Thompson et al. |
| 8,200,775 B2 | 6/2012 | Moore |
| 8,204,965 B2 | 6/2012 | Shkedi |
| 8,214,650 B2 | 7/2012 | Dickinson et al. |
| 8,234,218 B2 | 7/2012 | Robinson et al. |
| 8,244,551 B1 | 8/2012 | Mund |
| 8,244,830 B2 | 8/2012 | Robinson et al. |
| 8,266,438 B2 | 9/2012 | Orsini et al. |
| 8,271,802 B2 | 9/2012 | Orsini et al. |
| 8,281,336 B2 | 10/2012 | Shkedi |
| 8,296,323 B2 | 10/2012 | Pollard |
| 8,296,393 B2 | 10/2012 | Alexander et al. |
| 8,301,724 B2 | 10/2012 | Alexander et al. |
| 8,316,237 B1 | 11/2012 | Felsher et al. |
| 8,316,450 B2 | 11/2012 | Robinson et al. |
| 8,320,560 B2 | 11/2012 | Orsini et al. |
| 8,321,267 B2 | 11/2012 | Hoerenz |
| 8,321,791 B2 | 11/2012 | Dixon et al. |
| 8,327,141 B2 | 12/2012 | Vysogorets et al. |
| 8,332,638 B2 | 12/2012 | Orsini et al. |
| 8,341,247 B2 | 12/2012 | Shkedi |
| 8,346,569 B2 | 1/2013 | Schneiderman et al. |
| 8,346,792 B1 | 1/2013 | Baker et al. |
| 8,356,077 B2 | 1/2013 | Robinson et al. |
| 8,364,713 B2 | 1/2013 | Pollard |
| 8,374,386 B2 | 2/2013 | Beyram et al. |
| 8,380,630 B2 | 2/2013 | Felsher |
| 8,386,509 B1 | 2/2013 | Scofield et al. |
| 8,412,770 B2 | 4/2013 | Marcucci et al. |
| 8,417,698 B2 | 4/2013 | Yoo |
| 8,418,055 B2 | 4/2013 | King et al. |
| 8,429,013 B2 | 4/2013 | Symons et al. |
| 8,429,545 B2 | 4/2013 | Dixon et al. |
| 8,438,095 B1 | 5/2013 | Blake |
| 8,447,630 B2 | 5/2013 | O'Brien et al. |
| 8,468,244 B2 | 6/2013 | Redlich et al. |
| 8,473,313 B2 | 6/2013 | Abreu |
| 8,473,756 B2 | 6/2013 | Orsini et al. |
| 8,478,645 B2 | 7/2013 | Russek |

(56) References Cited

U.S. PATENT DOCUMENTS

| | | |
|---|---|---|
| 8,494,969 B2 | 7/2013 | Dickinson et al. |
| 8,495,384 B1 | 7/2013 | DeLuccia |
| 8,498,941 B2 | 7/2013 | Felsher |
| 8,510,424 B2 | 8/2013 | Ewing et al. |
| 8,510,841 B2 | 8/2013 | Richard et al. |
| 8,514,718 B2 | 8/2013 | Zijst |
| 8,516,267 B2 | 8/2013 | Spalka et al. |
| 8,516,377 B2 | 8/2013 | Dixon et al. |
| 8,521,857 B2 | 8/2013 | Maxwell et al. |
| 8,522,011 B2 | 8/2013 | Spalka et al. |
| 8,527,307 B2 | 9/2013 | Hamilton et al. |
| 8,538,011 B2 | 9/2013 | Moskowitz |
| 8,539,359 B2 | 9/2013 | Rapaport et al. |
| 8,543,665 B2 | 9/2013 | Ansari et al. |
| 8,544,104 B2 | 9/2013 | Burke et al. |
| 8,560,456 B2 | 10/2013 | Williams |
| 8,566,164 B2 | 10/2013 | Shkedi et al. |
| 8,566,726 B2 | 10/2013 | Dixon et al. |
| 8,572,385 B2 | 10/2013 | Papamanthou et al. |
| 8,577,805 B1 | 11/2013 | Oakes, III et al. |
| 8,577,831 B2 | 11/2013 | Bollen et al. |
| 8,577,933 B2 | 11/2013 | Evenhaim |
| 8,578,166 B2 | 11/2013 | De Monseignat et al. |
| 8,589,440 B1 | 11/2013 | Chaganti et al. |
| 8,595,069 B2 | 11/2013 | Shkedi et al. |
| 8,595,257 B1 | 11/2013 | Ovide |
| 8,595,297 B2 | 11/2013 | Marcucci et al. |
| 8,600,776 B2 | 12/2013 | Raduchel |
| 8,600,830 B2 | 12/2013 | Hoffberg |
| 8,600,895 B2 | 12/2013 | Felsher |
| 8,612,469 B2 | 12/2013 | Neff et al. |
| 8,620,810 B2 | 12/2013 | Karantzis |
| 8,626,804 B2 | 1/2014 | Xu |
| 8,626,834 B2 | 1/2014 | Singh et al. |
| 8,635,701 B2 | 1/2014 | Hilaiel et al. |
| 8,639,592 B1 | 1/2014 | Rouse et al. |
| 8,639,920 B2 | 1/2014 | Stack et al. |
| 8,640,206 B2 | 1/2014 | Betsch et al. |
| 8,644,502 B2 | 2/2014 | Orsini et al. |
| 8,645,210 B2 | 2/2014 | Lee et al. |
| 8,645,270 B2 | 2/2014 | Mallean et al. |
| 8,645,478 B2 | 2/2014 | Gaddala |
| 8,650,083 B2 | 2/2014 | Doughty et al. |
| 8,654,760 B2 | 2/2014 | Rosenberg et al. |
| 8,654,971 B2 | 2/2014 | Orsini et al. |
| 8,655,939 B2 | 2/2014 | Redlich et al. |
| 8,656,189 B2 | 2/2014 | Orsini et al. |
| 8,661,247 B2 | 2/2014 | Spalka et al. |
| 8,676,937 B2 | 3/2014 | Rapaport et al. |
| 8,677,148 B2 | 3/2014 | O'Hare et al. |
| 8,677,398 B2 | 3/2014 | Shkedi |
| 8,677,505 B2 | 3/2014 | Redlich et al. |
| 8,682,349 B2 | 3/2014 | Sayed |
| 8,682,683 B2 | 3/2014 | Ananian |
| 8,683,502 B2 | 3/2014 | Shkedi et al. |
| 8,683,575 B2 | 3/2014 | Meketa |
| 2002/0099824 A1* | 7/2002 | Bender et al. .................. 709/225 |
| 2008/0126476 A1* | 5/2008 | Nicholas et al. ............... 709/203 |
| 2011/0231246 A1 | 9/2011 | Bhatia et al. |

* cited by examiner

DUAL BLIND METHOD AND SYSTEM FOR ATTRIBUTING ACTIVITY TO A USER

CROSS-REFERENCE TO RELATED APPLICATIONS

This application claims priority to U.S. Provisional Patent Application Ser. No. 61/443,122, to Jaye et al., entitled "A Dual Blind Method and System for Attributing Activity to a User," and filed Feb. 15, 2011, the contents of which are incorporated herein by reference.

BACKGROUND OF THE INVENTION

The invention relates generally to systems and methods for attributing activity of a user viewing content such as online advertising, and more specifically to a method and system for measuring the impact of online advertising on offline sales while protecting the privacy of the consumer.

It is useful for vendors who sell items through the Internet to be able to compile sophisticated marketing data that gauges the return on investment (also referred to herein as "ROI") of a particular online advertising campaign based on actual offline purchases by consumers who have viewed the advertising. By learning which advertising methods are most successful, vendors can better tailor their advertising campaigns to achieve the greatest return on investment. Prior methods for determining the ROI of an online advertising campaign require sharing a consumer's personally identifiable information among many parties.

While consumers may share personal identification with web sites when purchasing items or services, consumers are hesitant to share personal identification information when not required. Also, due to the many laws governing the protection of personal identification information and additional security required, vendors do not wish to capture and store such information when not required.

What is desired then is a system for measuring the impact of online advertising on offline sales that maintains the privacy of consumer's personal identification information.

BRIEF SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for a dual blind method and system for attributing activity to a user.

In one aspect, the invention features a method including sending a first request for content from a browser executing on a consumer device to a first content provider. The first content provider may be a website that displays online advertising. The first content provider responds to the request by generating a browser identifier and sending the browser identifier along with the requested content (i.e. advertisement) to the browser. Next, the user browser sends a second request for content to a second content provider. The second content provider may be a retailer's website through which the consumer desires to make a purchase. The consumer shares personal identification information with the second content provider. Continuing the example of the consumer purchasing an item, the consumer may share the consumer's name, shipping address, credit card information or other personal information to complete the transaction.

The second content provider contacts an attribute server to retrieve attributes associated with the consumer and generates a temporary ID. The second content provider then shares the attributes and the temporary ID with an analytics server. The second content provider also instructs the browser to share the browser ID and the temporary ID with a user profile server. The user profile server uses the browser ID to retrieve a user profile associated with the browser and sends the user profile along with the temporary ID to the analytics server. The analytics server then uses the temporary ID to match the attributes to the user profile and destroys the temporary ID. Thus, neither the attributes nor the user profile can be tracked back to the original consumer from the analytics server.

Other features and advantages of the invention are apparent from the following description, and from the claims.

BRIEF DESCRIPTION OF THE DRAWINGS

The invention will be more fully understood by reference to the detailed description, in conjunction with the following figures, wherein.

DETAILED DESCRIPTION OF THE INVENTION

Figure 1A:
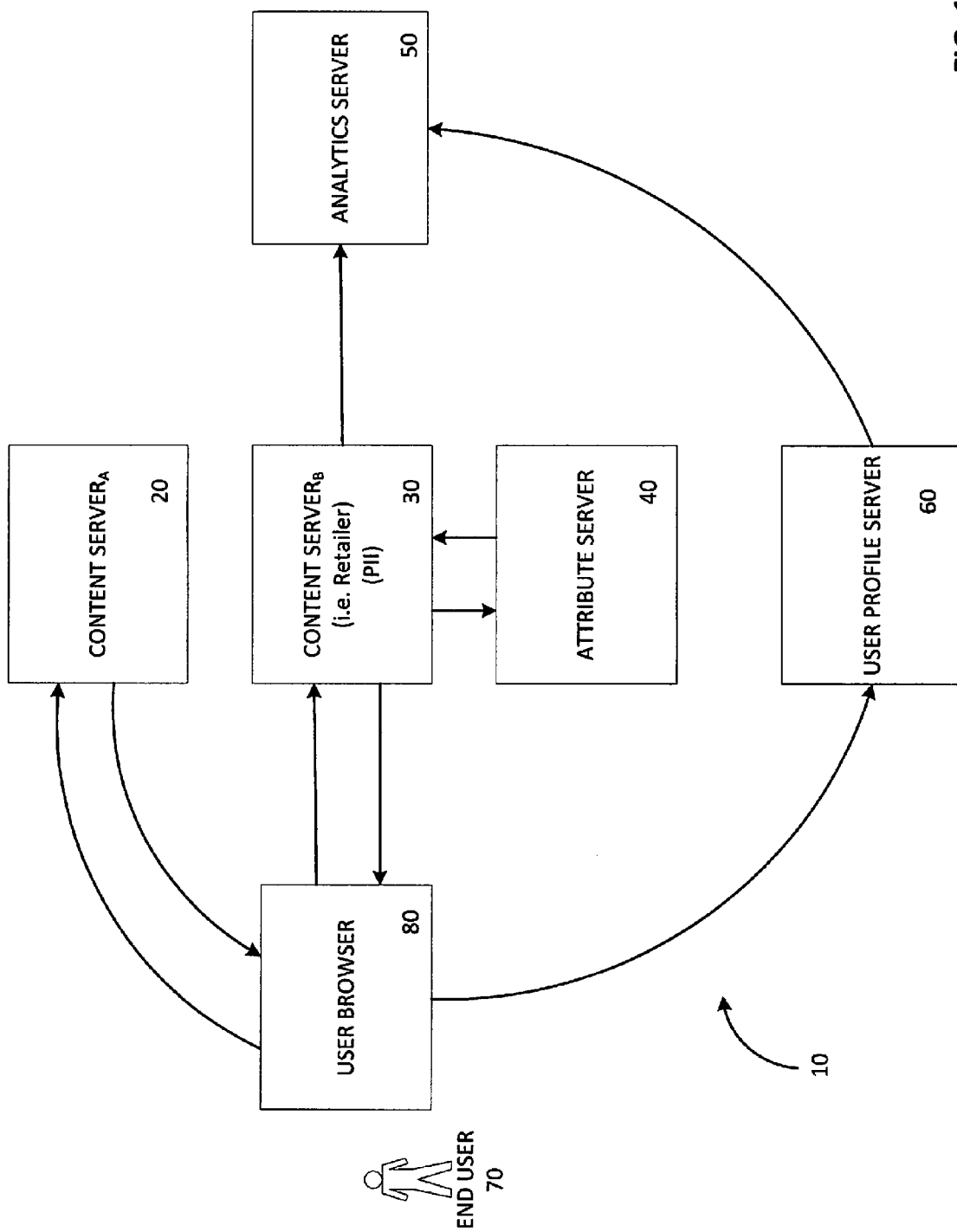
FIG. 1A is a block diagram of an embodiment of a dual blind system for attributing activity to a user.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Referring to FIG. 1A and in brief overview, an embodiment of a system 10 constructed in accordance with the invention includes a content provider$_A$ 20, a second content provider$_B$ 30, an attribute server 40, an analytics server 50, and a user profile server 60. In the embodiment shown, the content provider$_A$ 20, the content provider$_B$ 30, the attribute server 40, the analytics server 50, and the user profile server 60 are capable of communicating by communication channels. The communication channels may be any type of communication system by which elements of the system 10 may communicate. For example, the elements of the system 10 may communicate by a global communications network (i.e. Internet or World Wide Web), or via an intranet.

The content provider$_A$ 20 may be any web server that is accessible to an end user 70 through the internet. The content provider$_A$ 20 may be an internet search engine, an online media site, a social media site or any other web site that may display an advertisement to an end user 70. The end user 70 is a potential consumer of the advertised item or service. The user 70 may employ a user browser 80 executing on a user device to contact the content provider$_A$ 20. The user device may be a desktop, laptop, mobile phone, or any other computer or other device capable of accessing the internet. In one embodiment, the content server$_A$ 20 is the same server as the user profile server 60.

The content provider$_B$ 30 hosts a website that is accessible to the end user 70 through the internet. Continuing the example from above, the content provider$_B$ 30 may be a retailer's website through which the end user 70 desires to make a purchase. In this example, the end user 70 is able to purchase items from the content provider$_B$ (retailer server) 30. In another embodiment, the content provider$_B$ 30 can be any entity operating a website into which personal identification is entered.

Figure 2:
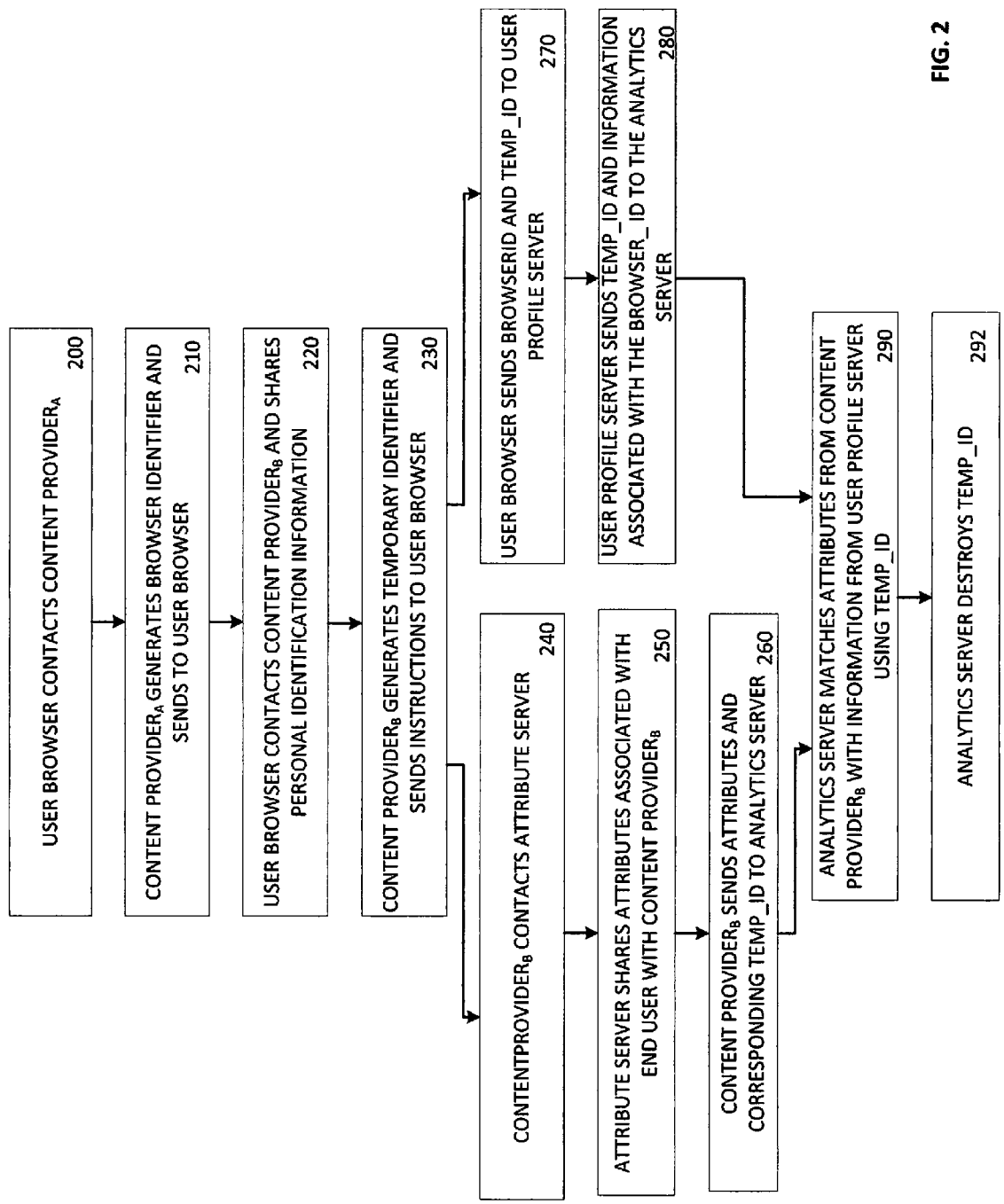
FIG. 2 is a flowchart representation of a process for attributing activity to a user utilizing the system of FIG. 1A.

The operation of the system 10 is described with reference to the flowchart of FIG. 2. In step 200, the end user 70 employs the user browser 80 to contact the content provider$_A$ 20. Next, in step 210, the content provider$_A$ 20 performs the initial tag drop by generating a browser identifier (also referred to herein as "BrowserID") and assigning the browser identifier to the user browser 80. The content provider$_A$ 20 sends the BrowserID to the user browser 80 and the user browser 80 stores the BrowserID. In one embodiment, the BrowserID is sent to the user browser 80 as a cookie. In another embodiment, rather than generating the BrowserID and sending it to the user browser 80, the content provider$_A$ 20 instructs the user browser 80 to generate and store the BrowserID.

After viewing an advertisement, promotion or other information on the website hosted by the content provider$_A$ 20, the end user 70 may decide to visit the website of the retailer or other entity that published the advertisement or offered the promotion. In step 220, the end user 70 utilizes the user browser 80 to navigate to the content provider$_B$ 30. Continuing the example from above, the content provider$_B$ 30 is a website hosted by a retailer. While visiting the website hosted by the content provider$_B$ 30, the end user 70 may register with the site, purchase an item or perform another activity which requires the end user 70 to share personal identification information (also referred to herein as "PII") with the content provider$_B$ 30. The end user's 70 personal identification information may include the end user's name, residence, mailing address, telephone number, email address, age, gender, credit card number or any other information that may be used to identify the end user 70. As described above, in another embodiment, content provider$_B$ is any entity operating a website. Content provider$_B$ may or may not be the entity who published an ad on content provider$_A$'s site.

Upon receiving the end user's 70 personal identification information, in step 230, the content provider$_B$ 30 generates a temporary identifier (also referred to herein as "TempID") and sends the TempID to the user browser 80, along with instructions for the user browser 80 to send the TempID and the BrowserID to the user profile server 60. In one embodiment, the TempID is a random number that is generated to be within a particular range of numbers and is used to match up the data in the two systems. It is important to note that content provider$_B$ 30 does not "know" the BrowserID that was assigned by the advertising site or content provider$_A$ 20. In step 240, the content provider$_B$ 30 contacts the attribute server 40 for any attributes associated with the end user 70. The content provider$_B$ 30 and the attribute server 40 may share only certain items of the end user's 70 personal identification information. In one embodiment, the content provider$_B$ 30 and the attribute server 40 share all of the end user's 70 personal identification information. In yet another embodiment, the content provider$_B$ 30 and the attribute server 40 share a user identifier (also referred to herein as "UserID") assigned to the end user 70. In one such embodiment, the content provider$_B$ 30 looks up the UserID and shares the UserID with the attribute server 40. In yet another such embodiment, the attribute server 40 looks up the UserID and shares it with the content provider$_B$ 30. The UserID may be based on the end user's 70 personal identification information or it may be a unique identifier assigned to the end user 70. In one embodiment in which the UserID is based on the end user's 70 personal identification information, the UserID is a hash (or other one-way function) of some or all of the personal identification information.

Next, in step 250, the attribute server 40 responds to content provider$_B$'s 30 inquiry and shares the attributes associated with the end user 70. In one embodiment, the attribute server 40 encrypts the attributes associated with the end user 70 prior to sending to the content provider$_B$ 30. Upon receiving the attributes associated with the end user 70, in step 260 the content provider$_B$ 30 sends the end user attributes and corresponding TempID previously generated by the content provider$_B$ 30 to the analytics server 50. In another embodiment, the content provider$_B$ 30 and the attribute server 40 do not communicate directly with each other, but rather through the user browser 80. For example, in step 240, the content provider$_B$ 30 contacts the attribute server 40 for any attributes associated with the end user 70 by sending a request to the user browser 80. The user browser 80 then passes the request to the attribute server 40. The attribute server 40 sends the attributes associated with the end user 70 to the user browser 80, which in turn forwards the information to the content provider$_B$ 30.

Referring again to FIG. 2, upon receiving the instructions sent by the content provider$_B$ 30 in step 230, the user browser 80 follows the instructions and sends the BrowserID assigned by the content provider$_A$ 20 and the TempID assigned by the content provider$_B$ 30 to the user profile server 60 in step 270. Next, in step 280, the user profile server 60 retrieves any information previously stored that is associated with the BrowserID and sends the TempID and any retrieved information to the analytics server 50. The user profile server 60 does not forward the BrowserID to the analytics server 50.

After receiving the information from the content provider$_B$ 30 and the user profile server 60, in step 290, the analytics server 50 matches the attributes from the content provider$_B$ 30 with the information from the user profile server 60 using the TempID. In one embodiment, the analytics server 50 then destroys the TempID in step 292 to further ensure that none of the information may be traced back to the end user 70.

In one embodiment, the communications between the user browser 80, the user profile server 60 and the analytics server 50 occur at substantially the same time as the communications between the content provider$_B$ 30, the attribute server 40 and the analytics server 50. In another embodiment, the communications between the user browser 80, the user profile server 60 and the analytics server 50 occur at different times than the communications between the content provider$_B$ 30, the attribute server 40 and the analytics server 50. In the embodiment in which the attribute server 40 encrypts the attributes and sends the encrypted attributes to the content provider$_B$ 30, the analytics server 50 decrypts the encrypted attributes.

In still another embodiment, two versions of the TempID are created—TempID$_1$ and TempID$_2$. The two versions of the TempID may be created using probabilistic public key encryption of the original TempID. In one such embodiment, the analytics server 50 has a public/private key pair. The analytics server 50 keeps the private key secret. The corresponding public key is shared with the content provider$_B$ 30 and is used to encrypt the original TempID and create TempID$_1$ and TempID$_2$. In this embodiment, TempID$_1$ is only shared by the content provider$_B$ 30 and the analytics server 50 and TempID$_2$ is only shared by the content provider$_B$ 30 and the user profile server 60. Upon receiving the message from the content provider$_B$ 30 with TempID$_1$ and the message from the user profiler server 60 with TempID$_2$, the analytics server 50 uses the corresponding private key (which only the analytics server 50 knows) to decrypt TempID$_1$ and TempID$_2$ to obtain the original TempID and thereby match the attribute server 40 data with the user profile server 60 data using the original TempID. The decrypted original TempID is then destroyed by the analytics server 50.

In yet another embodiment, the analytics server 50 may send the merged attribute and user profile data to yet another server. In this embodiment, the analytics server 50 sends the analysis to another server and may only temporarily store the analysis.

Figure 1B:
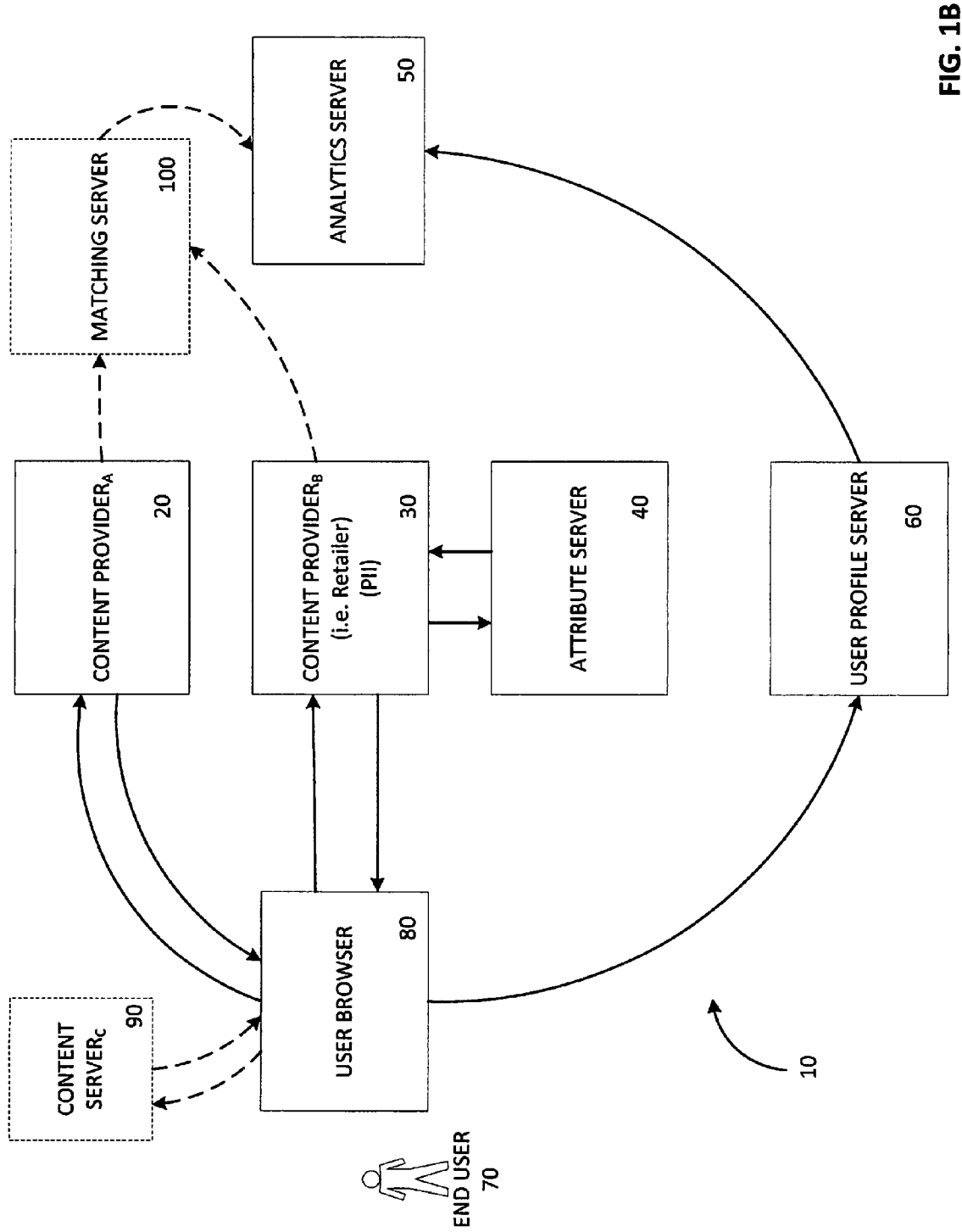
FIG. 1B is a block diagram of another embodiment of a dual blind system for attributing activity to a user that includes a matching server.

Referring now to FIG. 1B, in yet another embodiment, the system 10 includes a third content provider$_C$ 90. In this embodiment, the content provider$_A$ 20 may instruct the user browser 80 to retrieve the TempID from the third content provider$_C$ 90. In another such embodiment, two versions of the TempID are used. The third content provider$_C$ 90 returns a first version TempID$_1$ that is generated using probabilistic public key encryption of the BrowserID. The user profile server 60 also generates a second version TempID$_2$ also using probabilistic public key encryption of the BrowserID. As the analytics server 50 has the private key corresponding to the public key used by the additional content provider$_C$ 90 and the user profile server 60 to generate TempID1 and TempID2, respectively, the analytics server 50 uses the private key to decrypt TempID1 and TempID2 to reveal the original TempID and match the attribute server 40 data with the user profile server 60 data. The decrypted original TempID is then destroyed by the analytics server 50. In another embodiment, a different public/private key pair is used by the additional content provider$_C$ 90 and the user profile server 60. The analytics server 50 has both private keys and thus may still decrypt TempID$_1$ and TempID$_2$ to reveal the original TempID and match the data. In yet another embodiment, the additional content provider$_C$ 90 and the user profile server 60 encrypt a hash of the BrowserID to generate TempID$_1$ and TempID$_2$, respectively.

In certain applications, it may be desirable to track information relevant to a certain segment of consumers, rather than a particular consumer. In order to achieve this goal, in one embodiment of the system 10, rather than assigning a unique BrowserID to each user browser 80, a non-uniquely identifiable segment identifier (also referred to herein as "SegmentID") is assigned to multiple browsers/computers based on criteria such as market segment. Using SegmentIDs also further helps to increase end user anonymity as multiple users may share the same SegmentID.

In the embodiment shown in FIG. 1B, the system 10 further optionally comprises a matching server 100. In this embodiment, in addition to generating the BrowserID, the content provider$_A$ 20 also performs a hash or other one-way function on the BrowserID. The content provider$_A$ 20 passes the hash of the BrowserID to the matching server 100. Rather than the content provider$_B$ 30 sending the end user attributes and corresponding TempID to the analytics server 50 as shown in step 260, the content provider$_B$ 30 passes the data from the attribute server 40 to the matching server 100. The matching server 100 then forwards the data from the attribute server 40 along with the hash(BrowserID) to the analytics server 50. In this embodiment, the user profile server 60 also passes a hash of the BrowserID to the analytics server 50, which then matches the two sources using the hash(BrowserID). The analytics server 50 then destroys the hash(BrowserID).

In another embodiment, rather than sending a hash of the BrowserID, the plaintext BrowserID is encrypted with the public key of a public/private key pair of which the private key is only known by the analytics server 50. In this embodiment, a probabilistic public key encryption of the BrowserID is shared with the matching server 100 and the analytics server 50. In still a further embodiment, the hash of the BrowserID is encrypted with the public key corresponding to the private key known only to the analytics server 50.

In another embodiment, the TempID is a random number that is generated to be within a particular range of numbers and is used to match up the data in the two systems.

Figure 3A:
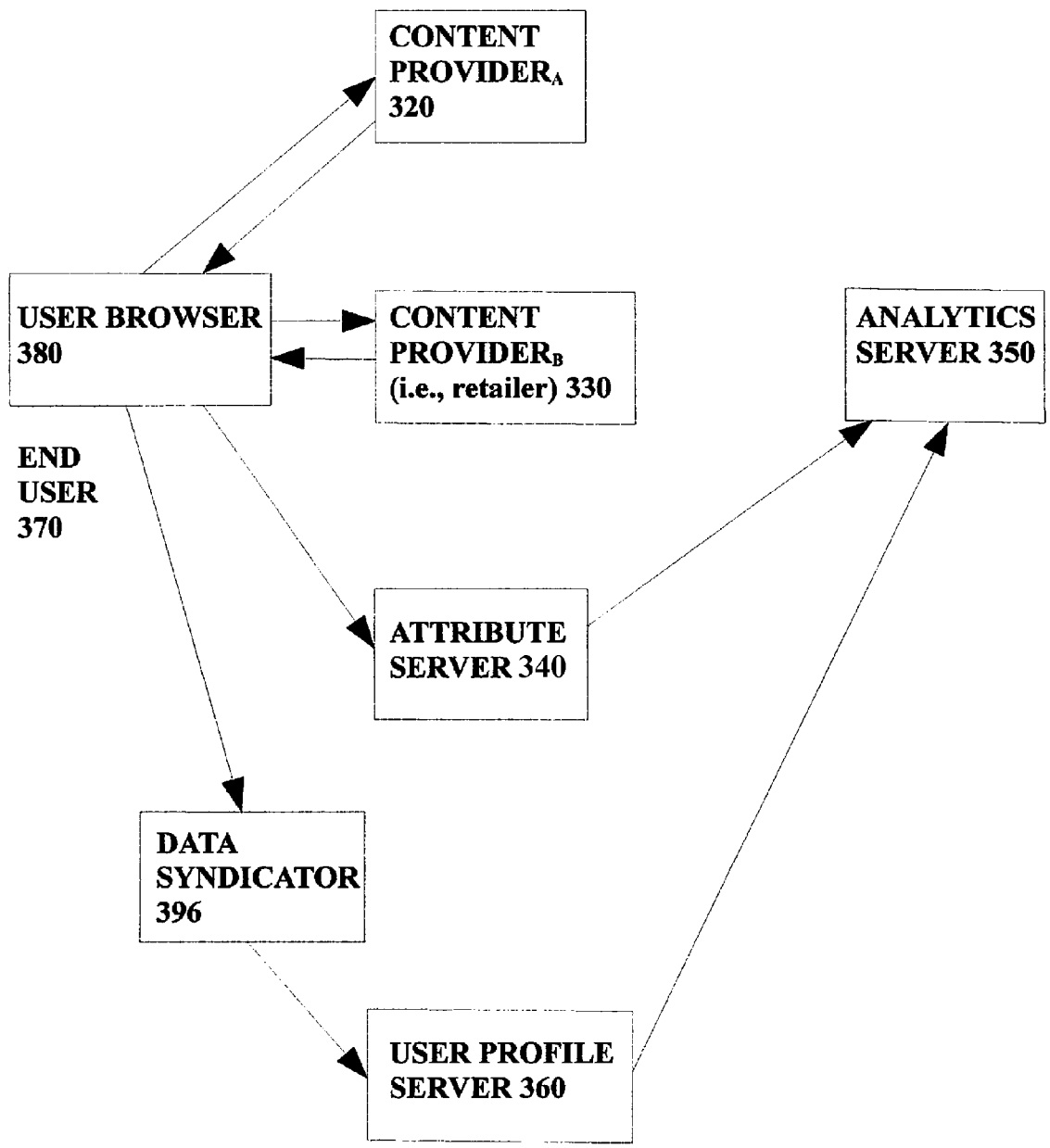
FIG. 3A is a block diagram of another embodiment of a system for attributing activity to a user.

Referring now to FIG. 3 another embodiment of a system 300 constructed in accordance with the invention includes a content provider$_A$ 320, a retailer server 330, an attribute server 340, an analytics server 350, and a user profile server 360. In the embodiment shown, the content provider$_A$ 20, the content provider$_B$ 30, the attribute server 40, the analytics server 50, and the user profile server 60 are capable of communicating via communications channels. As described above, the communications channels may be any type of communication system by which elements of the system 300 may communicate. For example, the elements of the system 300 may communicate by a global communications network (i.e. Internet or World Wide Web), or via an intranet.

Figure 4:
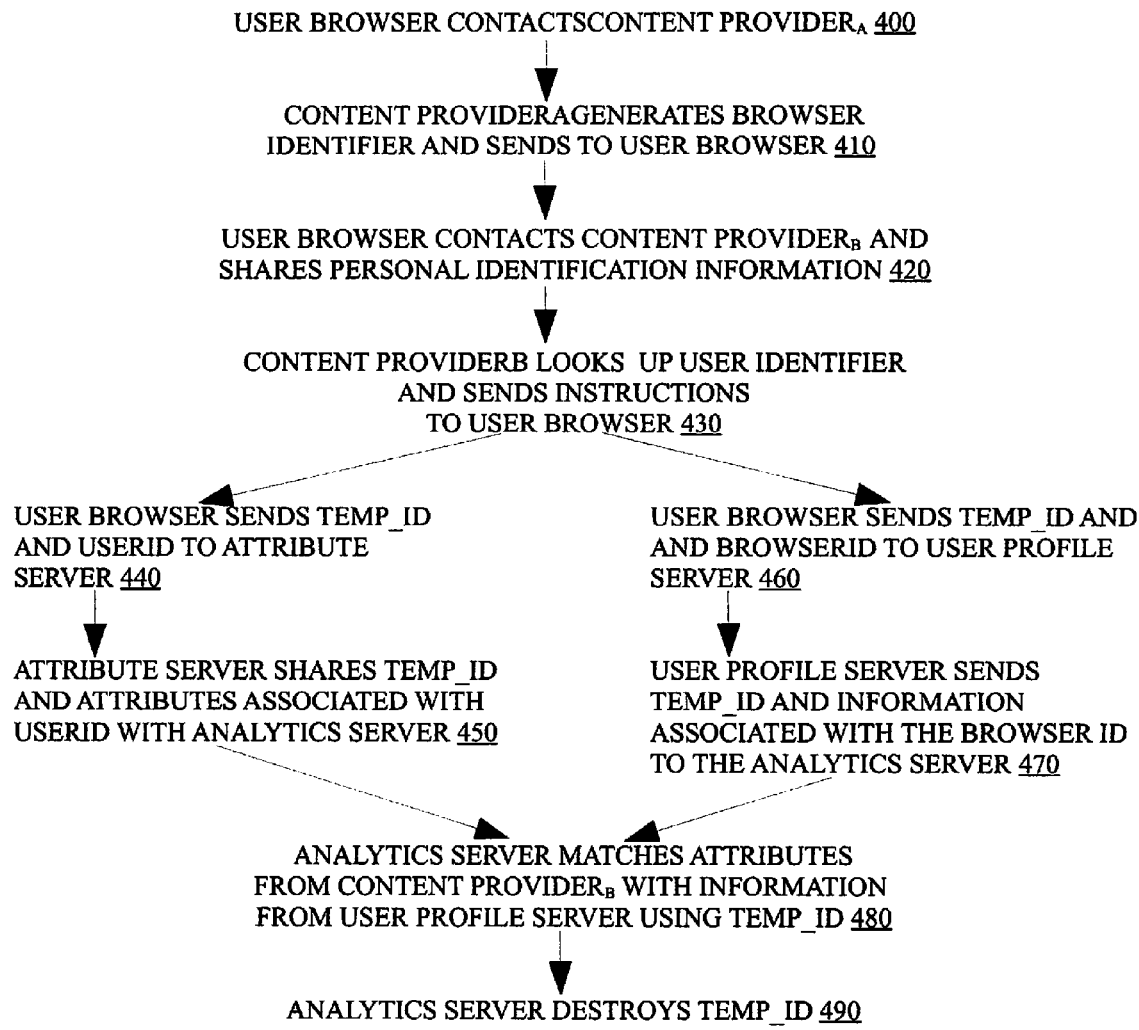
FIG. 4 is a flowchart representation of a process for attributing activity to a user employing the system of FIG. 3.

The operation of the system 300 is described with reference to the flowchart of FIG. 4. In step 400, the end user 370 employs the user browser 380 to contact the content provider$_A$ 320. Next, in step 410, the content provider$_A$ 320 performs the initial tag drop by generating a BrowserID and assigning the browser identifier to the user browser 380. The content provider$_A$ 320 sends the BrowserID to the user browser 380 and the user browser 80 stores the BrowserID. In one embodiment, the BrowserID is sent to the user browser as a cookie. In another embodiment, rather than generating the BrowserID and sending it to the user browser 380, the content provider$_A$ 320 instructs the user browser 380 to generate and store the BrowserID.

Similar to the process described above in the discussion of the flowchart of FIG. 2, after viewing an advertisement, promotion or other information on the website hosted by the content provider$_A$ 320, the end user 370 may decide to visit the website of the retailer or other entity that published the advertisement or offered the promotion. In step 420, the end user 370 utilizes the user browser 380 to navigate to the content provider$_B$ 330. While visiting the website hosted by the content provider$_B$ (retailer) 330, the end user 370 may register with the site, purchase an item or perform another activity which requires the end user 370 to share personal identification information with the content provider$_B$ 330 and/or a provider operating on behalf of provider$_B$ 330. As described above, the end user's personal identification information may include the UserID, the end user's name, residence, mailing address, telephone number, email address, age, gender, credit card number or any other information that may be used to identify the end user 370. Shared personal information includes instructions to notify the user profile server 360 by sending the UserID and not any other personal information.

Upon receiving the end user's 370 personal identification information, in step 430, the content provider$_B$ 330 looks up the UserID and sends the TempID and UserID to the user browser 380, along with instructions. The content provider$_B$ 330 instructs the user browser 380 to send the TempID and BrowserID to the user profile server 360 and to send the TempID and UserID to the attribute server 340. It is important to note that the content provider$_B$ 30 does not "know" the BrowserID that was assigned by the content provider$_A$ 20. In step 440, the user browser 380 transmits the TempID and the UserID to the attribute server 340. Next, in step 450, the attribute server 340 transmits the TempID and the attributes associated with the UserID to the analytics server 350. In one embodiment, the attribute server 340 encrypts the attributes prior to sending to the analytics server 350.

In step 460 the user browser 380 continues to follow its instructions and sends the TempID and the BrowserID to the user profile server 360. Next, in step 470, the user profile server 360 retrieves any information previously stored that is associated with the BrowserID and sends the TempID and any retrieved information to the analytics server 350. The user profile server 360 does not forward the BrowserID to the analytics server 350.

After receiving the information from the attribute server 340 and the user profile server 360, in step 480, the analytics server 350 matches the attributes from attribute server 340 with the information form the user profile server 360 using the TempID. In one embodiment, the analytics server 350 then destroys the TempID in step 490 to further ensure that none of the information may be traced back to the end user 370. In the embodiment in which the attribute server 340 encrypts the attributes, the analytics server 350 decrypts the attributes.

In one embodiment, the communications between the user browser 380, the user profile server 360 and the analytics server 350 occur at substantially the same time as the communications between the user browser 380, the attribute server 340 and the analytics server 350. In another embodiment, the communications between the user browser 380, the user profile server 360 and the analytics server 350 occur at different times than the communications between the user browser 380, the attribute server 340 and the analytics server 350. In the embodiment in which the attribute server 340 encrypts the attributes and sends the encrypted attributes to the analytics server 350, the analytics server 350 decrypts the encrypted attributes.

In another embodiment, the UserID is a hash of one or more elements of the end user's 370 personal identification information, and the content provider$_B$ 330 shares the hash (PII) with the attribute server 340.

Similar to the system 10 of FIG. 1A, in another embodiment, two versions of the TempID are created—TempID$_1$ and TempID$_2$. The two versions may be created using probabilistic public key encryption of the original TempID. In one such embodiment, the analytics server 350 has a public/private key pair. The analytics server 350 keeps the private key secret. The corresponding public key is used to encrypt the original TempID and create TempID$_1$ and TempID$_2$. In this embodiment, TempID$_1$ is only shared with the attribute server 340 and TempID$_2$ is only shared with the user profile server 360. Upon receiving the messages from attribute server 340 with TempID$_1$ and the user profile server 360 with TempID$_2$, the analytics server 350 uses the corresponding private key (which only the analytics server 50 knows) to decrypt TempID$_1$ and TempID$_2$ and thereby match the attribute server 340 data with the user profile server 360 data. The decrypted original TempID is then destroyed by the analytics server 350.

Figure 3B:
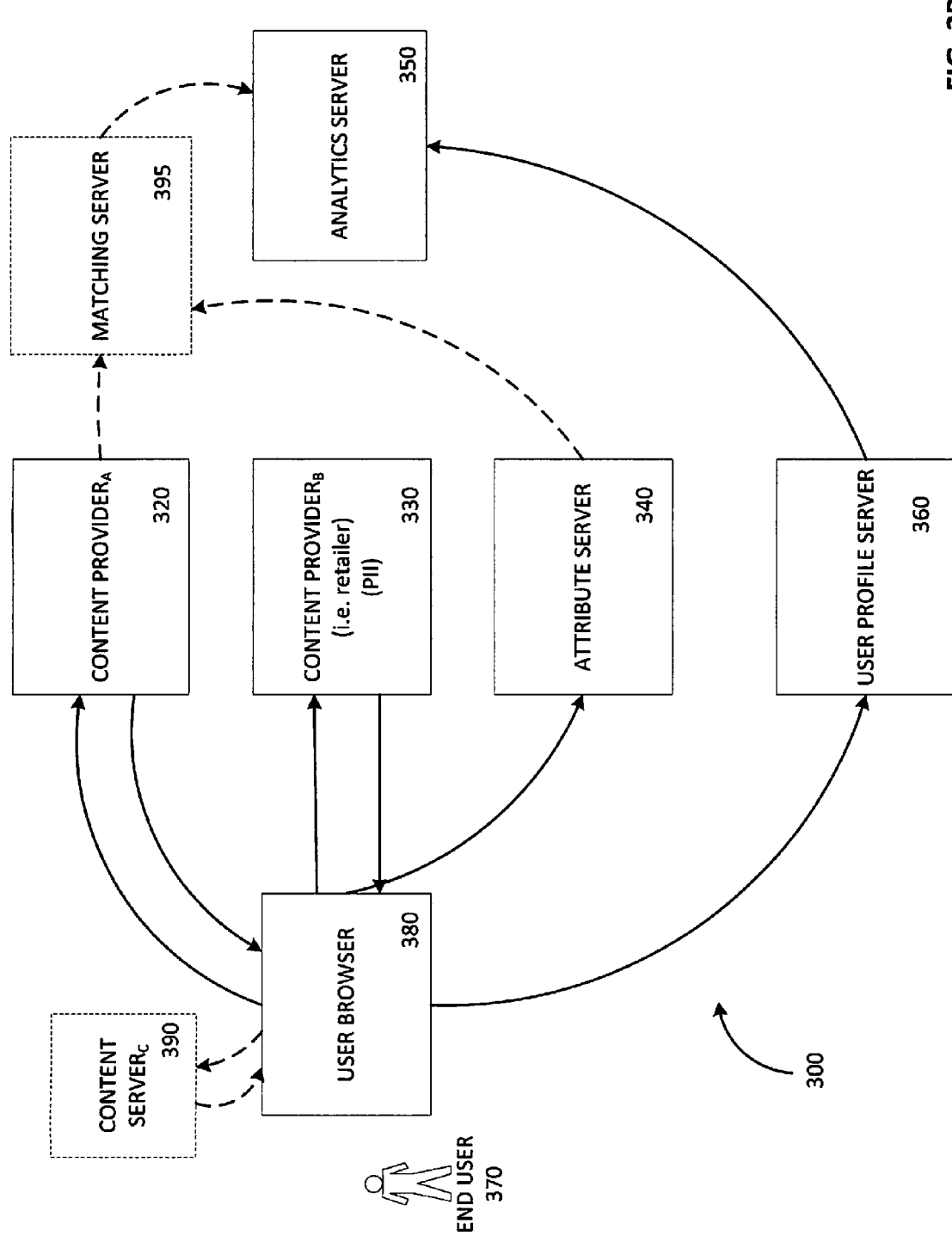
FIG. 3B is a block diagram of the system of FIG. 3A with additional optional components.

In still another embodiment shown in FIG. 3B, the system 300 includes a third content provider$_C$ 390. In this embodiment, the content provider$_A$ 320 may instruct the user browser 380 to retrieve the TempID from the third content provider$_C$ 390. In another such embodiment, two versions of the TempID are used. The third content provider$_C$ 390 returns a first version TempID$_1$ to the content provider$_B$ 330 that is generated using probabilistic public key encryption of the BrowserID. The user profile server 360 generates a second version TempID$_2$ also using probabilistic public key encryption of the BrowserID. As the analytics server 350 has the private key corresponding to the public key used to generate TempID$_1$ and TempID$_2$, respectively, the analytics server 350 uses the private key to decrypt TempID$_1$ and TempID$_2$ to reveal the original TempID and thereby match the attribute server 340 data with the user profile server 360 data. The decrypted original TempID is then destroyed by the analytics server 350. In another embodiment, a different public/private key pair is used to generate TempID$_1$ and TempID$_2$, respectfully. The analytics server 350 has both private keys and thus may still decrypt TempID$_1$ and TempID$_2$ and match the data. In yet another embodiment, the additional content provider$_C$ 390 and the user profile server 360 encrypt a hash of the BrowserID.

As shown in FIG. 3B, the system 300 may also optionally comprise a matching server 395. In this embodiment, in addition to generating the BrowserID, the content provider$_A$ 320 also performs a hash or other one-way function on the BrowserID. The content provider$_A$ 320 passes the hash of the BrowserID to the matching server 395. Rather than the attribute server 340 sending the end user attributes and corresponding TempID to the analytics server 350 as shown in step 450, the attribute server 340 passes the data to the matching server 395. The matching server 395 then forwards the data from the attribute server 340 along with the hash (BrowserID) to the analytics server 350. In this embodiment, the user profile server 360 passes a hash of the BrowserID to the analytics server 350, which then matches the two sources using the hash(BrowserID). The analytics server 350 then destroys the hash(BrowserID)

In another embodiment, rather than sending a hash of the BrowserID, the plaintext BrowserID is encrypted with the public key of a public/private key pair of which the private key is only known by the analytics server 350. In this embodiment, a probabilistic public key encryption of the BrowserID is shared with the matching server 395 and the analytics server. In still a further embodiment, the hash of the BrowserID is encrypted with the public key corresponding to the private key known only to the analytics server 350.

In another embodiment, the TempID is a random number that is generated to be within a particular range of numbers and is used to match up the data in the two systems.

In another embodiment, the system 300 further comprises a data syndicator 396. In embodiments having a data syndicator 396, additional user data is requested by the user browser 380 and sent to the user profile server.

The system 300 may further include a payment processor 397 that performs the function of the content provider$_B$ 330.

In another embodiment, once user profile data is received from the user profile server 360, and attributes are received from the attribute server 340, these attributes are brought together using the TempID. Once the data is merged, the analytics server 350 uses the new row of data to update a set of data summaries. These summaries keep a running tally of statistics based on the incoming data. When the data from the attribute server 340 and the user profile server 360 are brought together, the analytics server 350 may choose some or all of the possible combinations of attributes. These summaries are updated with the new data and then the source data is destroyed.

More specifically, when the analytics server 350 receives online and offline data with the TempID to match it, the analytics server 350 puts the data together. With a newly merged row of data, the analytics server 350 iterates through all combinations of columns and calculates all of the potential summaries on the data. Suppose, for example, the user profile server 360 sent data to the analytics server 350 that a user viewed ad number 1, and that the user has visited a BMW related site. The analytics server 350 receives from the attribute server 340 that the user purchased a BMW. This data is merged on the analytics server 350 as seen_ad=1, visited_site=1, purchase=BMW.

Summaries may be calculated for every combination (or some specified subset) of possible columns the following combinations generated:
  seen_ad=1
  visited_site=1
  purchase=BMW
  seen_ad=1, visited_site=1
  visited_site=1, purchase=BMW
  seen_ad=1, purchase=BMW
  seen_ad=1, visited_site=1, purchase=BMW Each one of the above combinations corresponds to one entry in a summary stored in a loosely structured database. Once this match happens, each one of those entries may be looked up and the appropriate number incremented. When a user of the analytics server 350 wants to know a specific breakdown of the data (e.g., how many users who saw the ad and purchased a BMW), the user can request the appropriate summary. After the appropriate entry in every possible summary is incremented, the matched data is completely thrown away and the summaries kept.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A computer-implemented method for attributing activity to a user, comprising the steps of:
sending from a first content provider in response to a first request for content from a user browser executing on a user device, requested content and a first identification (ID) to the user browser, the first ID capable of being stored on the user device;
receiving a second request for content at a second content provider from the user browser, the second request including user identification information, the second content provider:
retrieving attributes associated with the user identification information from an attribute server;
generating a temporary ID;
sending the attributes and the temporary ID to an analytics server;
sending a response to the user browser, the response including the temporary ID and an instruction to provide a user profile server with the first ID and the temporary ID;
receiving a user profile associated with the first ID and the temporary ID from the user profile server at the analytics server; and
using the temporary ID to associate the attributes with the user profile at the analytics server.

2. The method of claim 1, further comprising the analytics server performing the steps of:
generating a second ID and associating the second ID with the user profile and corresponding attributes; and
destroying the temporary ID.

3. The method of claim 2, wherein the step of generating the second ID further comprises performing a one-way function on the temporary ID combined with a predetermined value that is destroyed after a predetermined period of time.

4. The method of claim 2, wherein the analytics server generates the second ID immediately upon receipt of the attributes from the second content provider and destroys the temporary ID.

5. The method of claim 1, wherein the second content provider and the attribute server share a user ID associated with the user identification information, and the step of generating the temporary ID further comprises performing a one-way function on the user ID.

6. The method of claim 1 wherein the temporary ID is unique to the user browser for a predetermined period of time.

7. The method of claim 1, wherein the step of retrieving attributes associated with the user identification information from the attribute server further comprises the steps of:
sending, by the second content provider, an instruction to the user browser to request the attributes associated with the user identification information from the attribute server;
retrieving, by the user browser, the attributes associated with the user identification information from the attribute server.

8. The method of claim 7, wherein the step of sending the attributes and the temporary ID to the analytics server, further comprises the steps of:
sending the attributes and the temporary ID from the second content provider to the user browser; and
sending the attributes and the temporary ID from the user computer to the analytics server.

9. The method of claim 1, wherein the first content provider and the user profile server are the same computer.

10. The method of claim 1 further comprising:
using the temporary ID to merge user profile data from the user profile server and attributes from the attribute server; and
generating an entry of data from the merged information to update a set of data summaries, the summaries maintaining a tally of statistics based on received data while destroying the source data.

11. The method of claim 1, wherein the second content provider and the attribute server share a user ID associated with the user identification information, further comprising the steps of:
sending, by way of the user browser, the user ID and the temporary ID to the attribute server; and
sending, by the attribute server, the attributes associated with the user as well as the temporary ID.

12. The method of claim 1, further comprising the steps of:
merging, by the analytics server, the attributes and the user profile data;
sending, by the analytics server, the merged attributes and use profile data to an additional server.

13. The method of claim 1, further comprising the steps of:
generating a second temporary ID and a third temporary ID; and
sending the second temporary ID and the third temporary ID to the analytics server.

14. The method of claim 13, wherein the second temporary ID and the third temporary ID are created by using encryption of the temporary ID and the method further comprises the step of decrypting, by the analytics server, the second and third temporary IDs to obtain the temporary ID.

15. A computer-implemented method for attributing activity to a user, comprising the steps of:
sending from a first content provider in response to a first request for content from a user browser executing on a user device, requested content and a first identification (ID) to the user browser, the first ID capable of being stored on the user device;
receiving a second request for content at a second content provider from the user browser, the second request including user identification information, the second content provider:
retrieving attributes associated with the user identification information from an attribute server;
generating a temporary ID;
sending the attributes and the temporary ID to an analytics server;
sending a response to the user browser, the response including the temporary ID and an instruction to provide a user profile server with the first ID and the temporary ID;
receiving a user profile associated with the first ID and the temporary ID from the user profile server at the analytics server;
using the temporary ID to associate the attributes with the user profile at the analytics server;
generating, by the analytics server, a second ID and associating the second ID with the user profile and corresponding attributes;
destroying, by the analytics server, the temporary ID; and
wherein the second content provider and the attribute server share a user ID associated with the user identification information, and the step of generating the temporary ID further comprises performing a one-way function on the user ID.

16. A computer-implemented method for attributing activity to a user, comprising the steps of:

sending from a first content provider in response to a first request for content from a user browser executing on a user device, requested content and a first identification (ID) to the user browser, the first ID capable of being stored on the user device;

receiving a second request for content at a second content provider from the user browser, the second request including user identification information, the second content provider:
  retrieving attributes associated with the user identification information from an attribute server;
  generating a temporary ID;
  sending the attributes and the temporary ID to an analytics server;
  sending a response to the user browser, the response including the temporary ID and an instruction to provide a user profile server with the first ID and the temporary ID;

receiving a user profile associated with the first ID and the temporary ID from the user profile server at the analytics server;

using the temporary ID to associate the attributes with the user profile at the analytics server;

wherein the second content provider and the attribute server share a user ID associated with the user identification information, and the step of generating the temporary ID further comprises performing a one-way function on the user ID, and wherein the temporary ID is unique to the user browser for a predetermined period of time.

* * * * *